US012184122B2

(12) United States Patent
Kelly

(10) Patent No.: US 12,184,122 B2
(45) Date of Patent: Dec. 31, 2024

(54) ENHANCEMENTS TO COOLING MEANS FOR AXIAL FLUX GENERATORS

(71) Applicant: Time to Act Limited, Hertfordshire (GB)

(72) Inventor: Hugh-Peter Granville Kelly, Hertfordshire (GB)

(73) Assignee: Time To Act Limited, Hertfordshire (GB)

( * ) Notice: Subject to any disclaimer, the term of this patent is extended or adjusted under 35 U.S.C. 154(b) by 614 days.

(21) Appl. No.: 17/299,935

(22) PCT Filed: Dec. 6, 2019

(86) PCT No.: PCT/GB2019/053455
§ 371 (c)(1),
(2) Date: Jun. 4, 2021

(87) PCT Pub. No.: WO2020/115499
PCT Pub. Date: Jun. 11, 2020

(65) Prior Publication Data
US 2022/0052571 A1    Feb. 17, 2022

(30) Foreign Application Priority Data

Dec. 6, 2018  (GB) .................................... 1819926

(51) Int. Cl.
| | | |
|---|---|---|
| *H02K 1/20* | (2006.01) | |
| *H02K 9/06* | (2006.01) | |
| *H02K 9/10* | (2006.01) | |
| *H02K 16/02* | (2006.01) | |
| *H02K 16/04* | (2006.01) | |

(52) U.S. Cl.
CPC .................. *H02K 1/20* (2013.01); *H02K 9/06* (2013.01); *H02K 9/10* (2013.01); *H02K 16/02* (2013.01); *H02K 16/04* (2013.01)

(58) Field of Classification Search
CPC ...... H02K 1/2793; H02K 1/2798; H02K 3/24; H02K 1/20; H02K 16/02; H02K 16/04; H02K 9/00; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197; H02K 9/20; H02K 9/22
USPC ....... 310/52, 54, 55, 57, 58, 59, 60 R, 60 A, 310/64
See application file for complete search history.

(56) References Cited

U.S. PATENT DOCUMENTS

| | | | | |
|---|---|---|---|---|
| 2003/0080636 A1* | 5/2003 | Boardman | ................ | H02K 9/18 310/58 |
| 2010/0303652 A1* | 12/2010 | Peng | ....................... | F04D 17/16 417/423.1 |
| 2017/0012480 A1* | 1/2017 | Woolmer | ............... | H02K 9/197 |

FOREIGN PATENT DOCUMENTS

GB    2544275 A  *  5/2017  ........... H02K 1/2793

* cited by examiner

*Primary Examiner* — Alexander A Singh
(74) *Attorney, Agent, or Firm* — Hall Estill Law Firm

(57) ABSTRACT

A generator comprising a series of spaced annular stators sandwiched between a series of rotors, the rotors each being separated by annular collars, the annular collars defining a central cavity; at least one cooling gas source for supplying gas to the central cavity; vents through the annular collars for providing a means of egress for the cooling gas from the central cavity radially outwards over the rotors and the annular stators and the front, rear and side walls of coils embedded in the annular stators.

21 Claims, 5 Drawing Sheets

ENHANCEMENTS TO COOLING MEANS FOR AXIAL FLUX GENERATORS

CROSS-REFERENCE TO RELATED APPLICATIONS

The present application is a national stage application of a PCT application having International Application No. PCT/GB2019/053455, filed Dec. 6, 2019, which claims priority to GB Application No. 1819926.5, filed Dec. 6, 2018, the disclosure of which is hereby expressly incorporated herein by reference.

The following invention relates to means for enhancing the cooling of coil carrying stators of axial flux generators, and in particular, the cooling of stators of generators of the type described in my co-pending patent application nos GB2,520,516 and GB2,538,516.

Axial flux generators, especially those of large diameter and high output, are finding use in renewable energy applications, especially the conversion to electricity of mechanical energy harnessed by rotors of axial wind turbines. Current designs are capable of converting to electricity mechanical energy at megawatt or even multiple megawatt levels. In particular so called direct drive generators are receiving attention where the generator is driven directly by the turbine, without use of a gear box.

However, and in common with all electrical machines, heat losses arise from the very act of generation. By far, the most prominent of those are electrical heat losses. These arise due to $I^2R$ losses in the windings (coils) embodied within the stator of the generator. For example, in a large 5 MW capacity generator being run at 90% efficiency, winding losses result in the order of 10%×5 MW=0.5 MW This presents a profound problem in terms of dissipating and conducting away this significant and unwanted heat.

High capacity cooling means are required to convey safely away heat from the stator coils in order to avoid their overheating and consequent distortion and/or destruction of the entire stator frame in which they are embodied.

In my co-pending application no GB2,544,275 "Cooling means for direct drive generators", an arrangement is described in which air is forced, or inducted into, or both, a central plenum chamber situated within the centre of one or more annular stators, and then guided by slats in rotor separating collars to egress radially outwards as streams of air over the surfaces of the stators (and indeed the rotors sandwiching them). Heat radiating axially from the outwardly facing surfaces of coils embodied circumferentially around the stator is thus conducted away by the said streams of air passing radially over them.

However, it is often the case that the performance of a high performance generator is determined or limited by the actual degree to which this means of cooling is effective rather than other considerations—such as the rate of electromagnetic conversion of mechanical energy to electrical. Cooling means within this type of generator therefore plays a vital part in generators achieving their maximum output capacity, as well as safe operation. Means for enhancing further the rate of cooling remains a prime objective for designers of this type of generator.

According to the invention, cooling means for a stator comprising a plurality of spaced coils arranged within and around the circumference thereof comprises the forced passing of cooling fluid along and past the side surfaces of the coils.

In particular, the present invention provides a generator comprising: at least one annular stator having an inner circumference and an outer circumference and carrying a plurality of spaced coils arranged within and around the outer circumference of the annular stator; and at least one cooling gap for the flow of cooling fluid in the annular stator between adjacent coils of the plurality of coils and extending from the inner circumference to the outer circumference.

By this means, and in combination with the means of air cooling disclosed in my aforesaid application, heat is conveyed both from the surfaces of the coils and their sides.

Practical experimentation has shown this to be effective in reducing operational temperature of such stator coils from 157° C. to 127° C. This is a significant gain, enabling the generator to be driven harder and thus supply more electricity.

In the specific case of the stator of the generator of my co-pending patent application, the stator coils are substantially planar in construction, meaning the footprint occupied by their front and back surfaces considerably exceeds the area occupied by their sides. This may be the case in the present invention too. Typically the plan view of the coils is tear-drop meaning they are long in radial length and broader at their upper extents than their lower. Placing a sufficient number of coils side to side thus naturally forms a full annulus. In this arrangement, heat generated in the coils can emanate readily and be conducted away from their exposed front and back surfaces, but not from any other coil periphery, in particular the long radial portions of their neighbouring sides.

Clearly heat build-up does also occur laterally and should ideally be conducted away from these neighbouring side walls of the coils.

According to an aspect of the invention, the radially facing coil sides of such a generator are spaced apart from one another to form a portion of the cooling gap therebetween. A sealed channel for conveying a cooling liquid or gas can be accommodated therein. That is, the at least one cooling gap accommodates a sealed channel for conveying the cooling fluid. The advantage of the sealed channel is that if the cooling fluid is corrosive (such as marine air), it can be more surely prevented from coming into contact with the coils.

Preferably the sealed channel is formed of a non-magnetic material with a thermal conductivity of at least 0.5 W/mK, preferably at least 1 W/mK, more preferably at least 10 W/mK. Thus thermal energy can be conducted quickly through the thickness of the sealed channel.

According to an aspect of the invention, the channel is constructed from an electrically non-conductive material. By this means, any risk of eddy currents being induced in the material by magnetic flux sweeping past is obviated. Alternatively slits can be cut in the sealed channel to hinder circulation of eddy currents. Thus in an embodiment the sealed channel is formed of a non-electrically conducting material and/or has slits in it to prevent eddy currents being induced along its length.

Preferably the sealed channel is formed of a metal and/or the sealed channel is formed as a tube for ease of manufacture.

Preferably the channel is in the form of a metallic or heat conducting tube through which the cooling liquid or gas can be passed.

According to an aspect of the invention, the cooling is forced into the channel at one end and/or sucked out from its other end to enhance the rate of flow. Thus the generator further comprising: at least one cooling gas source for supplying gas to the at least one cooling gap at the inner circumference or the outer circumference at an over pressure for forcing cooling fluid through the cooling gap and/or an underpressure source connected to the at least one cooling gap at the outer circumference or the inner circumference for drawing cooling fluid through the cooling gap. This has the advantage of allowing a higher flow rate at a given pressure and therefore more efficient cooling. Additionally having both a cooling gas source and an underpressure source means that space, which is at a premium, particularly on a radially inward side of the coils, means that higher flow rates of cooling gas can be achieved.

According to an aspect, the cooling medium is gas, preferably air for reduced complexity.

In an aspect of the invention, to enhance conduction from the sides of the coils sandwiching the heat conducting channel, the channel is immersed in the potting resin used during manufacture of the stator to locate and maintain its coils in position. The potting resin can be of an industrial type specifically developed to conduct away heat, for example EIP 4260 available from Elan-tron® sold by Wire Electirc Supplies. EIP4260 is a two component epoxy system and has a thermal conductivity of 0.6-0.7 W/mK (ASTM C518). Thus in an embodiment the coils are embedded in a material with a thermal conductivity of at least 0.5 W/mK.

According to an aspect of the invention, each cooling gap or sealed channel is split into two portions as it nears the upper extent (radially outermost) of the parallel sides of the coils sandwiching it, and follows a curved path reaching around the upper peripheries of adjacent tear drop coils. A greater portion of the coil is cooled thereby. Cooling fluid can conveniently egress from the said split channels, coming up from either side of a coil and meeting up at the apex of each coil. Thus preferably the at least one cooling gap between adjacent coils of the plurality of coils comprises two outer separate gaps at a radially outer end. This allows the cooling fluid to get closer to the coils all around their periphery, enhancing the cooling effect. Preferably each separate gap is shaped to maintain a distance to an associated coil of the adjacent coils substantially constant. For example each of the separate gaps has a shape substantially corresponding to a shape of a radially outer portion of an associated coil. This further enhances the cooling effect.

In an embodiment separate gaps from adjacent cooling gaps meet at a radially outer apex of a coil. This allows easier connection to an outlet or an underpressure source.

Regulating the flow of the cooling liquid, for example air, evenly along each of the channels situated between each of the stator coils is important to avoid differentials in coil temperatures. According to an aspect of the invention, the inlet and/or outlet ports to each channel, or groups of channels, are equipped with flow regulating means. Each flow regulator can be pre-set during commissioning of the generator to ensure a substantially even flow is established past each coil. Thus the generator may further comprise at least one flow regulator for regulating the flow of cooling fluid through at least one of the at least one cooling gap. Ideally the flow regulator is a passive flow regulator, to ensure reliability and low cost.

The above arrangements thus provide means for conveying heat away from the sides of the stator coils, which, in combination with surface cooling of the coils as described in GB2,544,275, optimises the overall cooling thereof.

The invention will now be described with reference to the accompanying drawings in which.

Figure 1:
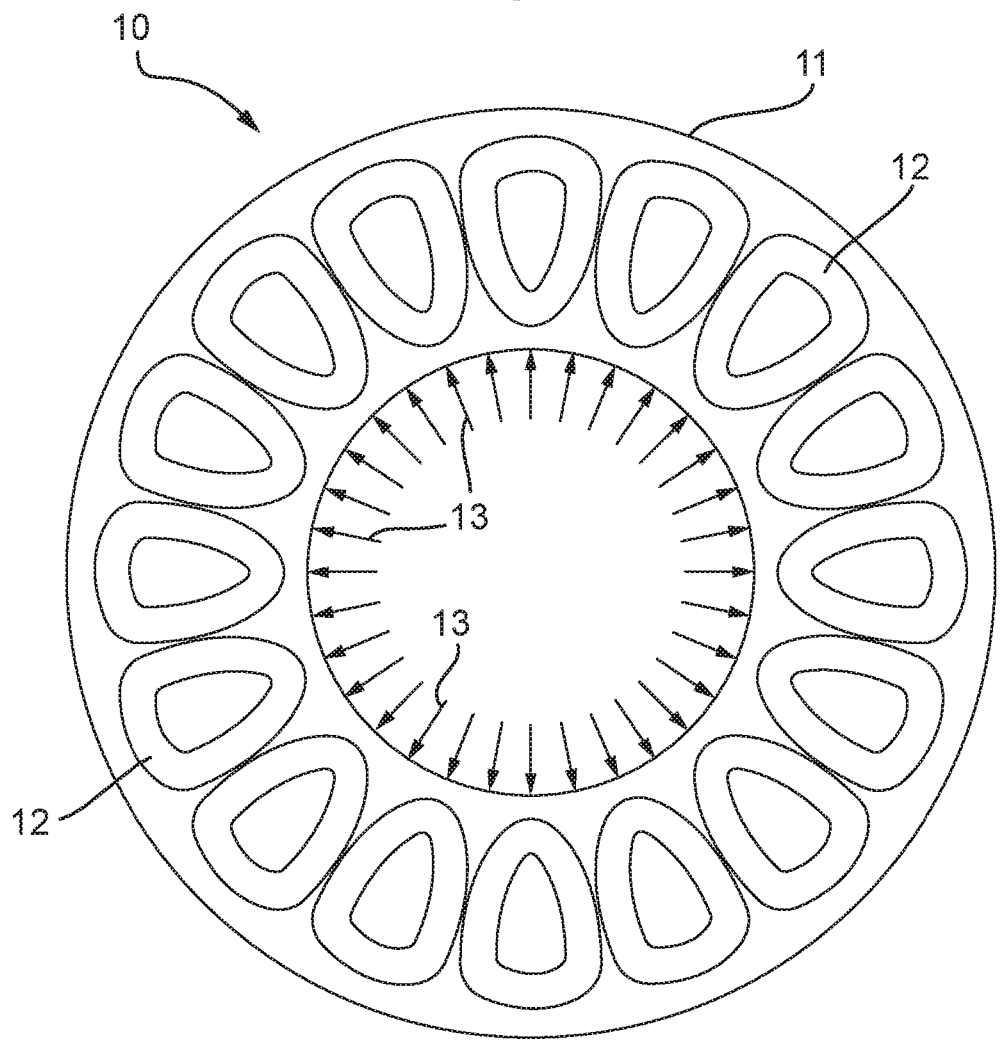
FIG. 1 shows a front view of a typical stator of an axial flux generator.

Referring to FIG. 1, a plan view of a stator of an axial flux generator (which may be a direct drive generator) is shown generally at 10. The stator comprises an annular disc 11, in which a number of stator coils 12 are embodied. The annular stator 11 has an inner circumference 300 and an outer circumference 200 and the plurality of spaced coils 12 are within the outer circumference 200 and around an axis of the annular stator. In accordance with my co-pending application, GB2,544,275 front and rear faces of the stator are cooled by air flow, 13, passing radially from the central region of the stator annulus outwardly past the coils. This arrangement is now shown in more detail with reference to FIG. 2.

Figure 2:
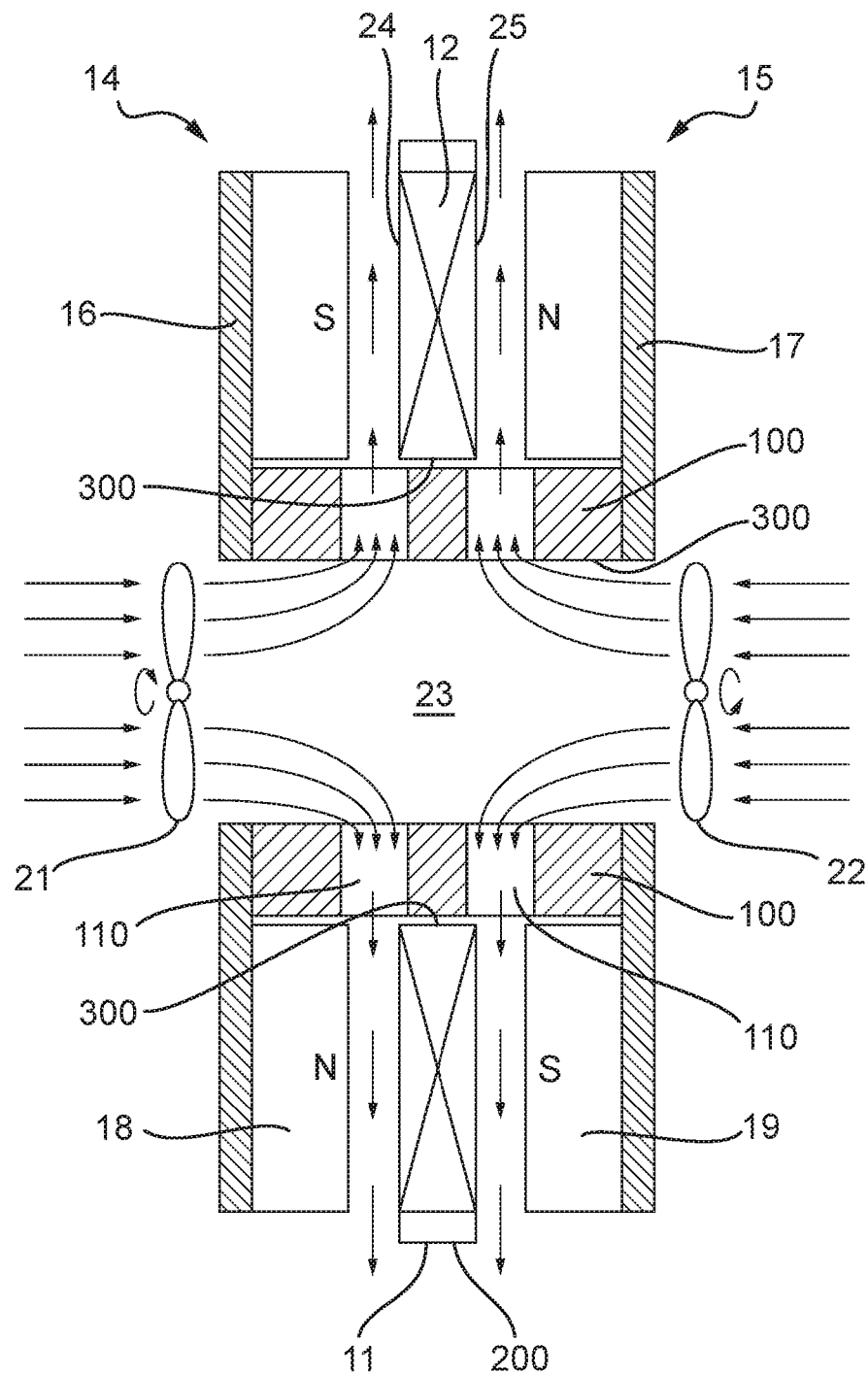
FIG. 2 shows an edge view, and cooling means to cool the front and back surfaces thereof.

FIG. 2 depicts a full rotor and stator assembly of an axial flux generator. Two rotors, 14 and 15, comprise backing iron plates 16 and 17 on which are mounted annuli 18 & 19 of permanent magnets. Flux passing across the air gap 20 cuts the turns of the coils 12 embodied in the stator disc 11, and electricity is thereby generated. The rotors turn relative to the stator, and are guided by bearing means (not shown). Cooling air is inducted by fans 21 & 22 into the central chamber region 23. Being under pressure, this air egresses through radial slots 110 past the exposed surfaces 24 & 25 of the stator (and also the inner surfaces of the magnet annuli) thereby to cool the coils contained within it. In an example each of the rotors 14, 15 is held in position relative to one another by intermediate annular collars 100. These rest against the radially inner region of the rotors 14, 15. Draw bolts, not shown, passing longitudinally through the rotors 14,15 and collars 100 from end to end hold the whole assembly together. The collars 100 may optionally be coaxially mounted upon and carried by a central cylinder (not illustrated). Cooling gas (e.g. air) is blown (e.g. pushed or sucked) into a central space 23 which includes the axis of the generator e.g. inside the collars 100 or central cylinder. The far end of the central cylinder may be blocked off (not shown) to prevent escape of the gas or another high pressure source (e.g. a fan as illustrated) may be positioned at the other axial end of the generator to prevent gas from escaping axially. Cooling of the rotors 11 and stators 15 is effected as follows.

Gas vents are provided radially through and circumferentially around the collars. They are aligned during manufacture with orifices situated along the central cylinder if the central cylinder is used. This provides a direct path for gas (e.g. under pressure) within the generator to egress from the axially central area 23 and out into the gap past the faces of both the rotors 14,15 and stators 12. The outlet of the vents 110 in the radially outermost surface of the collars are axially aligned with one or both axial ends of the stator coils and/or one or both outwardly facing axial ends of the permanent magnets. On account of the rotation of the rotors, this escaping gas is favourably distributed over the stator surfaces. The gas eventually escapes from the gap between the stator and rotor surfaces at a radially outer position.

However, as can be readily appreciated, the cooling fluid (e.g. gas, air) is not effective to cool the lateral sides of the coils. An arrangement for achieving this objective is now shown with reference to FIG. 3.

Figure 3:
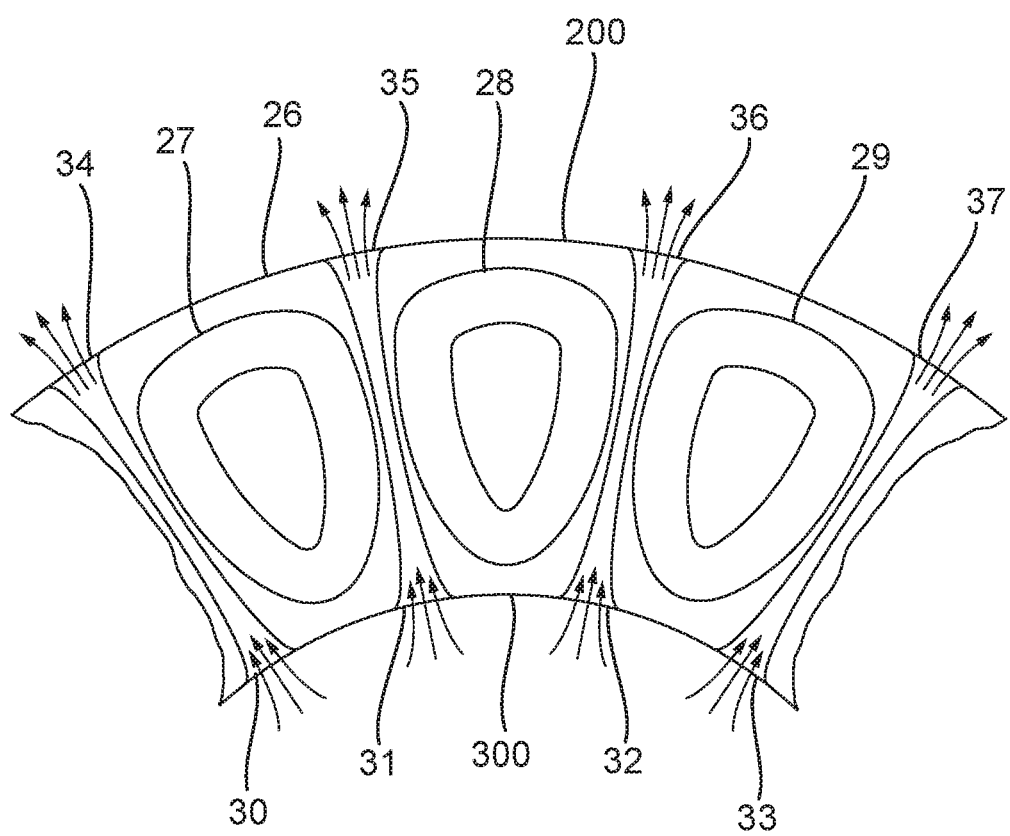
FIG. 3 shows again the stator of FIG. 1 but equipped with the cooling means of the present invention.

An expanded partial view of the stator disc is shown at 26 in FIG. 3. Coils 27, 28 & 29 are embodied within the stator as before, but laterally separated along their radial lengths. Air flow enters an inner opening (the inner opening is in the inner circumference 300 of the stator 11) of the cooling gaps between them as shown at 30-33 and thus flows past the sides of the coils to cool them. The warmed air egresses through corresponding openings 34-37 which are in the outer circumference 200 of the stator 11. By this means, coils are cooled both along their sides, and also over their front and rear faces by the means described with reference to FIG. 2. The collar 100, if present, will have an additional or a larger vent 110 in order that gas may be directed into the inner opening 30-33. That is, a vent 100 in the collar 100 will be present in the axial positions substantially corresponding to the axial positions of the inner openings 30-33.

Figure 4:
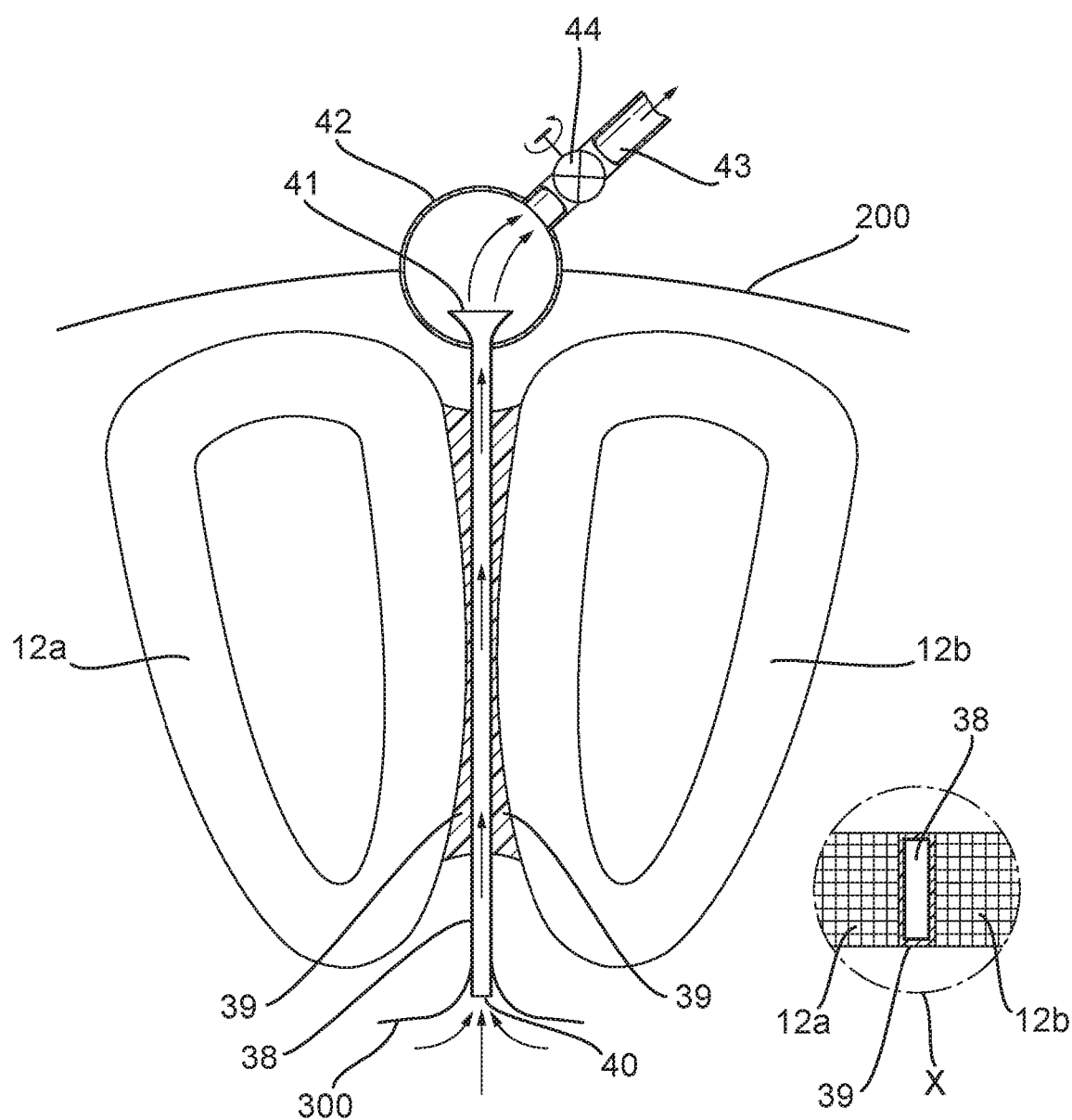
FIG. 4 shows in closer detail the cooling means of FIG. 3.

A method of implementing this system in practice is shown with reference to FIG. 4.

Stator coils are again shown, but to a large scale, at 12a and 12b. A hollow heat conducting sealed channel 38 is located in between and along their radial lengths, as shown. The sealed channel is preferably formed of a non-magnetic material with a thermal conductivity of at least 0.5 W/mK preferably at least 1 W/mK, more preferably at least 10 W/mK. Most metals have a thermal conductivity of 10 W/mK or more.

The sealed channel 38 is preferably formed of a non-electrically conducting material or has slits in it to prevent eddy currents being induced along its length. In a preferred embodiment the sealed channel is formed of a metal. This results in a high thermal conductivity and easy manufacture. In an embodiment the sealed channel 38 is conveniently formed as a tube.

The sealed channel 38 is embalmed within resin 39, also used (throughout) the stator to locate and maintain its coils in position. The resin is heat conducting and of the type commonly used in the construction of electric motors and generators. For example the resin can be of an industrial type specifically developed to conduct away heat, for example EIP 4260 available from Elan-tron® sold by Wire Electric Supplies. EIP4260 is a two component epoxy system and has a thermal conductivity of 0.6-0.7 W/mK (ASTM C518). Thus in an embodiment the coils are embedded in a material with a thermal conductivity of at least 0.5 W/mK.

By virtue of the sealed channel 38 having a ready interface contact with the sides of the coils, as provided by the aforesaid resin, heat conduction into the channel is facilitated. Ideally any resin between the coil and the sealed channel will be less than 3 mm thick, preferably less than 2.5 mm thick. A thin walled sealed channel 38 is preferably thin too, for example less than 1.0 mm thick, desirably less than 0.75 mm thick. Air flow—supplied under pressure—enters the sealed channel at opening 40, and travels along the sealed channel 38 to cool its sides. The egress point is shown at opening 41. To increase the rate of air flow a suction cap 42, may be placed thereover. Air is drawn by suction means (not shown) through the pipe 43 and vented freely.

In an embodiment at least one cooling gas source for supplying gas to the at least one cooling gap at the inner circumference or the outer circumference at an over pressure for forcing cooling fluid through the cooling gap is provided. In an embodiment additionally or alternatively an underpressure source connected to the at least one cooling gap at the outer circumference or the inner circumference for drawing cooling fluid through the cooling gap is provided. This has the advantage of allowing a higher flow rate at a given pressure and therefore more efficient cooling. That is, rather than forcing cooling gas into the at least one cooling gap at a higher pressure to achieve an increased cooling gas flow rate, the same effect can be achieved by providing an underpressure source at the opposite end of the at least one cooling gap. Such an arrangement allows gas source/underpressure source infrastructure (e.g. fans) to be placed on either side of the at least one cooling gap (e.g. radially inwardly and radially outwardly of the coils), so that space constraints radially inwardly of the coils do not restrict the achievable flow rate of gas through the at least one cooling channel. In the type of generator disclosed in our aforementioned co-pending application, it is common for the stator (and rotor) diameters to be large, even up to ten meters of more. In this case, the coils themselves are also commensurately large, often having radial coil side lengths of three to four meters. Ensuring the regular passage of cooling air down these extended lengths is especially important and in this respect the induction of air under pressure at one extent of the side of the coil, and its withdrawal by under pressure means at its other extent, is an important benefit. The arrangement can either force the cooling fluid radially inward or radially outward. A flow radially outward is preferred as this means that the heated cooling fluid is expelled more quickly from the generator.

Experimentation shows a "push/pull" arrangement enhances substantially the rate of passage of cooling fluid along the channel 38, thereby further to increase the effectiveness of the cooling system.

A valve 44 can be adjusted individually for each cooling channel to ensure the spread of cooling is substantially consistent over each coil. The valve can be located at any convenient point in the air supply/egress chain to control the flow rate. The valve 44 can be seen as at least one flow regulator for regulating the flow of cooling fluid through at least one of the at least one cooling gap. The flow regulator may be either active or passive. Active valves allow adjustment of the flow in real time and therefore good control of the temperature of the coils and/or pressure and/or flow rate of the cooling fluid cooling the coils (using a feedback loop based on a signal of a temperature sensor measuring the temperature of the coil adjacent the cooling gap whose flow is being regulated). In a preferred embodiment the flow regulator is a passive flow regulator. The valves can be set up during a commissioning phase to ensure that under most conditions the coils all have substantially the same temperature. This avoids expensive and potentially unreliable control systems.

Figure 5:
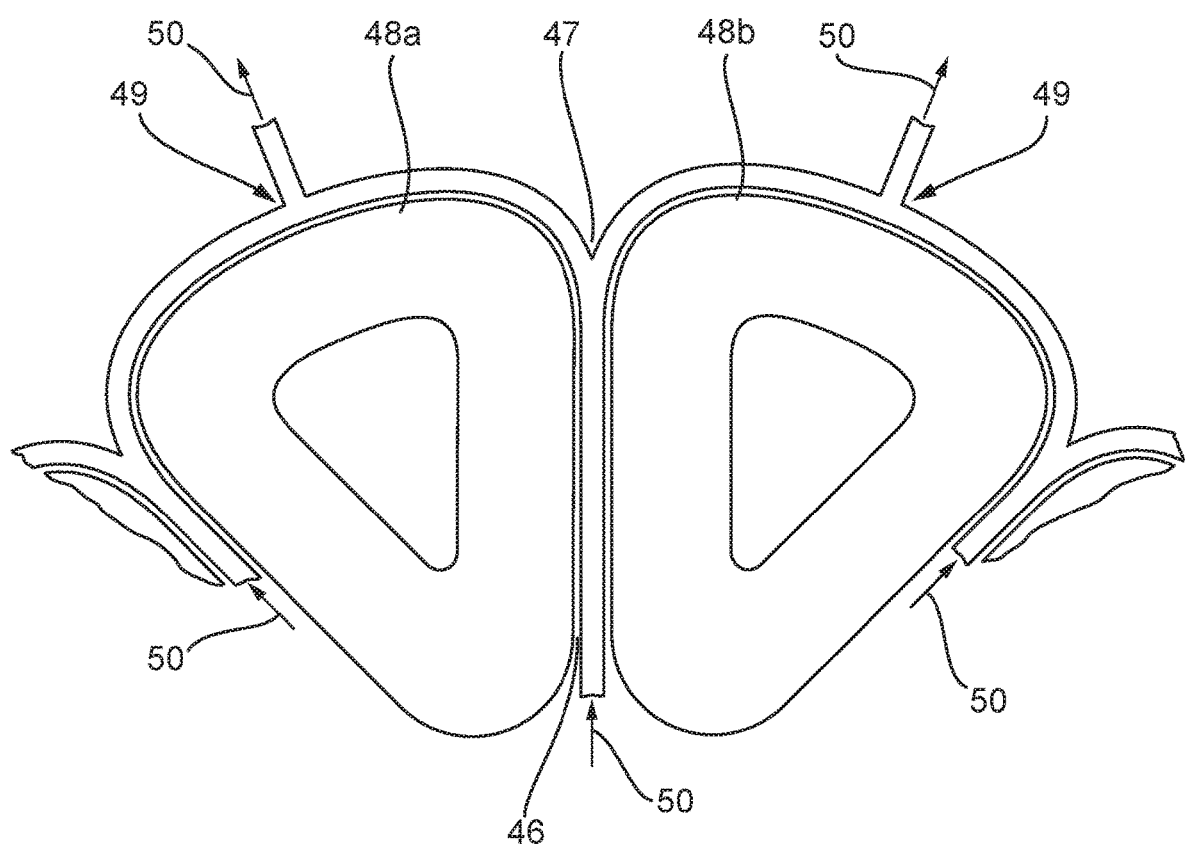
FIG. 5 shows an enhanced arrangement for cooling the peripheries of the coils.

Referring to FIG. 5, an arrangement is shown at 45 for further maximising heat transfer.

In this, rather than the channel lying solely in between and substantially parallel to the sides of the coils sandwiching it, the cooling gap 46 is split as shown at 47 and formed in circular fashion to follow around the top curved side wall portions 48a and 48b of adjacent "tear drop" coils. This can be seen as the at least one cooling gap between adjacent coils of the plurality of coils having two outer separate gaps at a radially outer end. As illustrated each separate gap may be shaped to maintain a distance to an associated coil of the adjacent coils substantially constant to ensure equal and optimal heat transfer all around the side of the coil. In an embodiment each of the separate gaps has a shape substantially corresponding to a shape of a radially outer portion of an associated coil.

Thus an inlet for cooling gas at a discrete location into the at least one cooling gap (to which an over pressure source can be connected) and/or an outlet from the at least one cooling gas (to which an underpressure source can be connected) are strategically placed to promote gas flow in the desired places. For example, if the cylindrical space surrounded by the coils is placed at an overpressure and cooling gas allowed to flow around the coils, both in the gap between coils adjacent to one another axially (i.e. from neighbouring stators, where the gas flows on either axial sides of the coils (past exposed surfaces 24, 25)) as well as through at least one cooling gap, if the outside of the coils is unrestricted, cooling gas may flow more easily and therefore faster in the gap between coils adjacent to one another axially that through at tat least one cooing gap, if the cooling gap is smaller than the space available for gas to flow in the gap between adjacent coils (which of course has a magnetic stator in it. Depending on the precise geometry, the reverse may be true. In order to promote gas flow in a desired location, the inlet for cooling gas and/or outlet for cooling gas are positioned strategically to promote flow in the at least one cooling gap. In one embodiment the inlet and/or outlet are positioned axially in line (e.g. in the same axial plane) as the coils of the associated cooling gap and/or circumferentially in-line with the cooling gap. This promotes cooling gas flow through the cooling gap in preference to flow in the gap between coils adjacent to one another axially. This is because the path from the inlet to the outlet via the gap between coils adjacent to one another axially is more tortuous. The presence of an underpressure source at the outlet of the cooling gap can further promote gas flow through the cooling gap in preference to flow in the gap between adjacent coils axially. In one embodiment the vents and/or orifices and/or further orifices described elsewhere are an inlet and/or outlet as described in this paragraph. In an embodiment the inlets and/or outlets are formed in the housing. In a preferred embodiment the inlets are formed as vents and the outlets are formed as outlets in the housing.

The cooling gap meets at the apex 49 of each coil a similar channel coming up from the opposite side. Air 50 is then extracted from both channels at this top meeting point. Thus the separate gaps from adjacent cooling gaps meet at a radially outer apex of a coil.

By this means, virtually all of the periphery of each coil enjoys effective cooling, thereby further increasing overall potential performance in terms of generation of power by better dissipation of coil winding heat.

Numerous variations will be apparent to those skilled in the art.

The invention claimed is:

1. A generator comprising:
   at least one annular stator having an inner circumference and an outer circumference and a plurality of spaced coils within and around an axis of the annular stator; and
   at least one cooling gap for the flow of cooling fluid in the annular stator between adjacent coils of the plurality of spaced coils, the at least one cooling gap having an inner opening in the inner circumference and an outer opening in the outer circumference, wherein the at least one cooling gap between adjacent coils of the plurality of coils accommodates a sealed channel for conveying the cooling fluid.

2. The generator of claim 1, wherein the sealed channel is formed of a non-magnetic material with a thermal conductivity of at least 0.5 W/mK.

3. The generator of claim 1, wherein the sealed channel is formed of a non-electrically conducting material or has slits in it to prevent eddy currents being induced along its length.

4. The generator of claim 1, wherein the sealed channel is formed of a metal.

5. The generator of claim 1, wherein the sealed channel is formed as a tube.

6. The generator of claim 1, further comprising an inlet for the cooling fluid into the at least one cooling gap which is positioned axially in-line with the coils of the associated adjacent coils and/or circumferentially in-line with the at least one cooling gap.

7. The generator of claim 1, further comprising an outlet for the cooling fluid out of the at least one cooling gap which is positioned axially in-line with the coils of the associated adjacent coils and/or circumferentially in-line with the at least one cooling gap.

8. The generator of claim 1, wherein the coils are embedded in a material with a thermal conductivity of at least 0.5 W/mK.

9. The generator of claim 1, wherein the at least one cooling gap between adjacent coils of the plurality of coils comprises two outer separate gaps, and wherein each separate gap is shaped to maintain a distance to an associated coil of the adjacent coils substantially constant.

10. The generator of claim 1, wherein the at least one cooling gap between adjacent coils of the plurality of coils comprises two outer separate gaps, and wherein separate gaps from adjacent cooling gaps meet at a radially outer apex of a coil.

11. The generator of claim 1, wherein the at least one cooling gap between adjacent coils of the plurality of coils comprises two outer separate gaps, and wherein each of the separate gaps has a shape substantially corresponding to a shape of a radially outer portion of an associated coil.

12. The generator of claim 1, further comprising at least one accessible flow regulator for regulating the flow of cooling fluid through at least one of the at least one cooling gap.

13. The generator of claim 1, further comprising at least one rotor spaced apart from the at least one stator and comprising a plurality of magnets.

14. The generator of claim 1, wherein the sealed channel is formed of a non-magnetic material with a thermal conductivity of at least 1 W/mK.

15. The generator of claim 1, wherein the sealed channel is formed of a non-magnetic material with a thermal conductivity of at least 10 W/mK.

16. The generator of claim 1, wherein the at least one cooling gap between adjacent coils of the plurality of coils comprises two outer separate gaps at a radially outer end.

17. A generator comprising:
    at least one annular stator having an inner circumference and an outer circumference and a plurality of spaced coils within and around an axis of the annular stator; and
    at least one cooling gap for the flow of cooling fluid in the annular stator between adjacent coils of the plurality of spaced coils, the at least one cooling gap having an inner opening in the inner circumference and an outer opening in the outer circumference, wherein the at least one cooling gap between adjacent coils of the plurality of coils comprises two outer separate gaps at a radially outer end; and
    at least one accessible flow regulator for regulating the flow of cooling fluid through at least one of the at least one cooling gap.

18. The generator of claim 17, wherein the flow regulator is a passive flow regulator.

19. The generator of claim 17, comprising a plurality of said flow regulators each associated with one of the at least one cooling gap, wherein said flow regulators are active flow regulators.

20. The generator of claim 17, further comprising a controller, wherein the controller controls the plurality of flow regulators according to signals representative of the temperature of a coil adjacent the associated cooling gap and/or pressure and/or flow rate of the cooling fluid cooling it.

21. A generator comprising:
   at least one annular stator having an inner circumference and an outer circumference and a plurality of spaced coils within and around an axis of the annular stator; and
   at least one cooling gap for the flow of cooling fluid in the annular stator between adjacent coils of the plurality of spaced coils, the at least one cooling gap having an inner opening in the inner circumference and an outer opening in the outer circumference, wherein the at least one cooling gap between adjacent coils of the plurality of coils comprises two outer separate gaps at a radially outer end, and wherein the coils are embedded in a material with a thermal conductivity of at least 0.5 W/mK.

* * * * *